(12) United States Patent
Tatschl et al.

(10) Patent No.: US 7,208,944 B2
(45) Date of Patent: Apr. 24, 2007

(54) METHOD FOR DETERMINING THE ANGULAR POSITION OF A ROTATING OBJECT AND ROTARY ENCODER

(75) Inventors: David Tatschl, Villach (AT); Dirk Hammerschmidt, Villach (AT); Tobias Werth, Villach (AT); Simon Hainz, Villach (AT)

(73) Assignee: Infineon Technologies AG, Munich (DE)

( * ) Notice: Subject to any disclaimer, the term of this patent is extended or adjusted under 35 U.S.C. 154(b) by 18 days.

(21) Appl. No.: 11/235,712

(22) Filed: Sep. 26, 2005

(65) Prior Publication Data

US 2006/0071659 A1 Apr. 6, 2006

(30) Foreign Application Priority Data

Sep. 27, 2004 (DE) ............... 10 2004 046 806

(51) Int. Cl.
*G01B 7/30* (2006.01)
(52) U.S. Cl. ............... 324/207.25; 324/207.2; 324/207.15
(58) Field of Classification Search ............... 324/207.12–207.25, 166–174
See application file for complete search history.

(56) References Cited

U.S. PATENT DOCUMENTS 4,014,014 A * 3/1977 Jones et al. ............... 341/113
4,897,647 A 1/1990 Sakamoto et al.
5,220,282 A * 6/1993 Zimmermann ............ 324/207.12
5,317,614 A 5/1994 Davis et al.
6,742,856 B2 * 6/2004 Tatsumi .................... 347/19
2002/0158935 A1 10/2002 Tatsumi
2006/0267529 A1 * 11/2006 Piefer et al. .............. 318/432

OTHER PUBLICATIONS

Michael Q. Le et al., "An Analog DFE for Disk Drives Using a Mixed-Signal Integrator", Solid-State Circuits Research Lab Department of Electrical and Computer Engineering.

* cited by examiner

*Primary Examiner*—Jay M. Patidar
(74) *Attorney, Agent, or Firm*—Dicke, billing & Czaja, PLLC

(57) ABSTRACT

A method for determining the angular position of a rotating object and rotary encoder is disclosed. In one embodiment, the method includes a method for determining the angular position of an object rotating about a rotation axis in a rotation direction and having a coding pattern, using a sensor that senses the coding pattern, including ascertaining the coarse angular position of the rotating object with respect to the sensor whilst taking account of the coding pattern at a first instant. The exact angular position of the rotating object is ascertained with respect to the sensor whilst taking account of the coarsely ascertained angular position and also whilst taking account of at least one section of the coding pattern which extends counter to the rotation direction proceeding from that location of the coding pattern which is assigned to the coarse angular position. An output signal is provided containing items of information about the exact angular position of the rotating object with respect to the sensor.

46 Claims, 7 Drawing Sheets

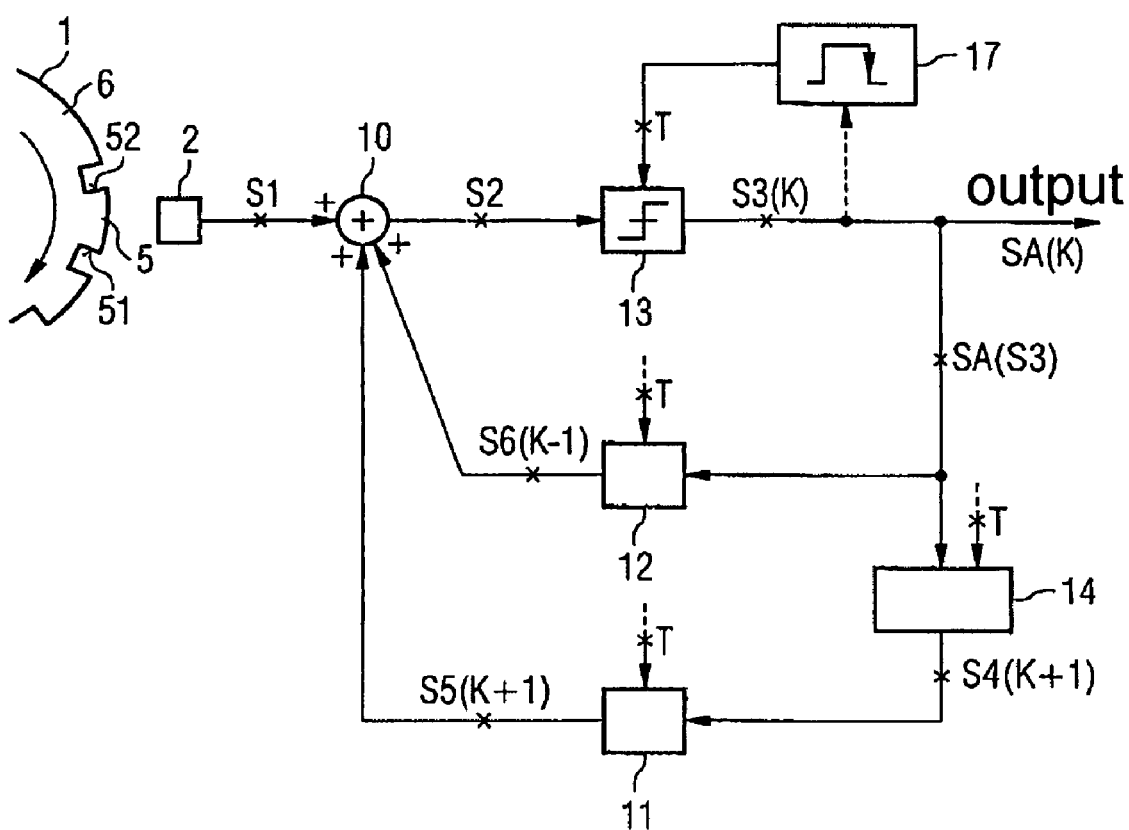

METHOD FOR DETERMINING THE ANGULAR POSITION OF A ROTATING OBJECT AND ROTARY ENCODER

CROSS-REFERENCE TO RELATED APPLICATIONS

This Utility Patent Application claims priority to German Patent Application No. DE 10 2004 046 803.6-52, filed on Sep. 27, 2004, which is incorporated herein by reference.

FIELD OF THE INVENTION

The invention relates to a method for identifying the angular position of a rotating object, in particular an object in the field of vehicle technology, such as, for example, a rotating shaft.

BACKGROUND

In many areas of technology the problem arises of determining as accurately as possible the angular position of an object rotating about a rotation axis. One widely used method in this respect consists in providing the rotating object with a suitable coding pattern that is sensed by means of a sensor in order thus to obtain items of information about the angular position of the rotating object. In this case, the detection of the coding pattern by the sensor is often effected contactlessly, for example with the use of a magnetic coding pattern and a magnetosensitive sensor.

One known method for identifying the angular position of an object rotating about an axis A is explained below with reference to FIGS. 1 and 2. In this case, a number of bar magnets 3, 4 are arranged around the periphery of the object 1 rotating about the rotation axis A, the longitudinal axis of said bar magnets being arranged in the radial direction of the rotating object 1. The rotating object 1 has a coding pattern dependent on the orientation of the individual bar magnets 3, 4. The individual bar magnets 3, 4 generate magnetic fields that are superposed to form a total magnetic field. The total magnetic field is sensed by a sensor 2 during a rotation of the rotating object about its axis in order to deduce from this the angular position of the rotating object with respect to the sensor 2.

The sensor 2 is a magnetic field sensor 9, for example a Hall sensor 8.

Referring to FIG. 1b, teeth 5, 6 similar to the teeth of a gearwheel may also be arranged around the periphery. Said teeth 5, 6 generally have different width, however. Accordingly, the gaps between two teeth 5, 6 spaced apart from one another in the peripheral direction are generally also of different sizes. The teeth 5, 6 and also the intervening gaps form a coding pattern of the rotating object 1.

The coding pattern is sensed by means of a sensor 2 comprising a magnetic field sensor and also a magnet 7.

The rotating object 1 is formed from magnetic material, so that the magnetic field that issues from the magnet 7 and is altered during the rotation of the rotating object 1 in a manner dependent on the coding pattern formed by the teeth 5, 6 can be ascertained by means of the magnetic field sensor 9.

The magnetic field sensor 9 shown in FIGS. 1 and 1b is a Hall element or a coil, for example. The sensor 2 has an analog output, which may be designed either as a differential output or as a single-ended output.

If the rotating object 1 shown in FIG. 1b rotates about its axis A in the direction of the arrow, then firstly the tooth 5 and then the tooth 6 passes the sensor 2. The tooth 5 is considered by way of example in the following text. The tooth 5 has a first tooth flank 51 and a second tooth flank 52. Upon rotation of the rotating object 1, firstly the first tooth flank 51 and then the second tooth flank 52 passes the sensor 2. The sensor outputs a signal each time a tooth flank 51 and 52 passes it.

FIG. 2 illustrates the typical profile of a signal S1 of this type as is output by the sensor 2 if the tooth flanks 51, 52 pass said sensor 2 in temporal succession. The sensor signal S1 represents a summation signal formed by the superposition of a plurality of partial signals, of which the partial signals S1a and S1b are illustrated by way of example.

The partial signal S1a corresponds to the signal component brought about by the flanks 51, that is to say corresponds to a signal that would be output by the sensor 2 if the rotating object 1 had merely the tooth flank 51 as a single tooth flank instead of a multiplicity of tooth flanks 51, 52. The profile of this partial signal S21 corresponds to a Lorentz curve.

The partial curve S1b correspondingly indicates how the signal S1 output by the sensor 2 would appear if the rotating object 1 had merely the second partial flank 52. The other teeth 6 of the rotating object 1 also correspondingly have tooth flanks 61, 62, each of which can be assigned a partial signal in the manner described. The sensor signal S1 arises from the superposition of all these partial signals.

The profile of the sensor signal S1 in the region of tooth flank 51 is thus determined not only by the partial signal S1a of the tooth flank 51 but also by the partial signal S2a of the tooth flank 52 and by the partial signals of the tooth flanks of adjacent teeth.

As can be seen from FIG. 2, the sensor signal S1 deviates from the profile of the respective partial signals S21, S22 on account of said superposition primarily in the region of the tooth flanks 51, 52. A specific partial signal is influenced in particular by the relatively close vicinity of the tooth flank assigned to the relevant partial signal. Since the teeth arranged around the periphery of the rotating object may have not only identical but also different tooth width and tooth spacings, the partial signals of different tooth flanks are generally influenced to different extents by the respective vicinities of the relevant tooth flanks, so that, proceeding from the sensor signal S1, the exact angular position of the rotating object 1 with respect to the sensor 2 can initially be ascertained only within the scope of the deviations described.

In order to improve the accuracy when determining the angular position of the rotating object, a method such as is illustrated on the basis of a block diagram in FIG. 3 has been utilized hitherto. In this case, the signal S1 supplied by a sensor 2 is firstly subjected to a signal conditioning by a signal conditioning unit 98, which essentially comprises a signal waveform distorter 90 and an amplitude distorter 92. The signal conditioning unit 98 serves for reducing the noise above the band limit.

The sensor signal S1 conditioned by the signal conditioning unit 98 is subsequently equalized by means of a feed forward equalizer (FFE) 93 and a downstream decision feedback equalizer (DFE) 94. The FFE 93 and the DFE 94 together form a zero forcing decision post-equalizer (zDFE) 99.

The output signal of the FFE 93 is fed to a subtractor 94a of the DFE.

The output of the substractor 94a is fed to a threshold value decoder 94b, which generates an output signal SA of the circuit.

Furthermore, said output signal SA is fed to a feedback filter 94c, which filters the output signal SA and feeds the filtered output signal SF to the subtractor 94a. As a result, the difference signal between the output signal SA and the filtered output signal SF of the circuit is fed to the threshold value decoder 94b thereby forming a signal feedback within the DFE 94.

The signal processing within the DFE 94 is effected in clocked fashion in such a way that, per clock period, a filtered output value S(k−1) of the filtered output signal, said value being ascertained during the previous clock period, is subtracted from an output value S(k) of the output signal of the FFE 93.

Since the output signal S(k−1) of the preceding clock period k−1 is generated from the coding pattern of the rotating object 1, the output signal S(k−1) of the preceding clock period k−1 contains an item of information about the coding pattern that influences the sensor signal S1 during the current clock period k on account of intersymbol interference (ISI).

By virtue of the filtering and the feedback of the output signal S(k−1) output during the preceding clock period k−1, it is thus possible, given a suitable configuration of the feedback filter 94c, to effect an improved determination of the angular position of the rotating object 1 with respect to the sensor 2, since the intersymbol interference is thereby eliminated to a certain degree.

Such methods and arrangements for suppressing intersymbol interference are described for example in Le, M. Q. et al.: "An Analog DFE for disk drives using a mixed-signal integrator", IEEE Journal, May 1999, VOL. 34 NO. 5, pages 592–598, or on the Internet under http://www.e-ce.ucdavis.edu/~hurst/papers/Le, JSSC99.pdf.

For these and other reasons there is a need for the present invention.

SUMMARY

The present invention provides a method for determining the angular position of a rotating object and rotary encoder. In one embodiment, the invention relates to a method for determining the angular position of an object rotating about a rotation axis in a rotation direction and having a coding pattern, using a sensor that senses the coding pattern, including ascertaining the coarse angular position of the rotating object with respect to the sensor whilst taking account of the coding pattern at a first instant. The exact angular position of the rotating object is ascertained with respect to the sensor whilst taking account of the coarsely ascertained angular position and also whilst taking account of at least one section of the coding pattern which extends counter to the rotation direction proceeding from that location of the coding pattern which is assigned to the coarse angular position. An output signal is provided containing items of information about the exact angular position of the rotating object with respect to the sensor.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 4 illustrates a block diagram of a rotary encoder that operates according to the method according to the invention.

FIG. 5b shows the clocked sampling of the sensor signal in accordance with FIG. 5a, but in the case of a rotating object that rotates slowly, with the sampling rate in accordance with FIG. 5a.

DETAILED DESCRIPTION

Figure 1B:
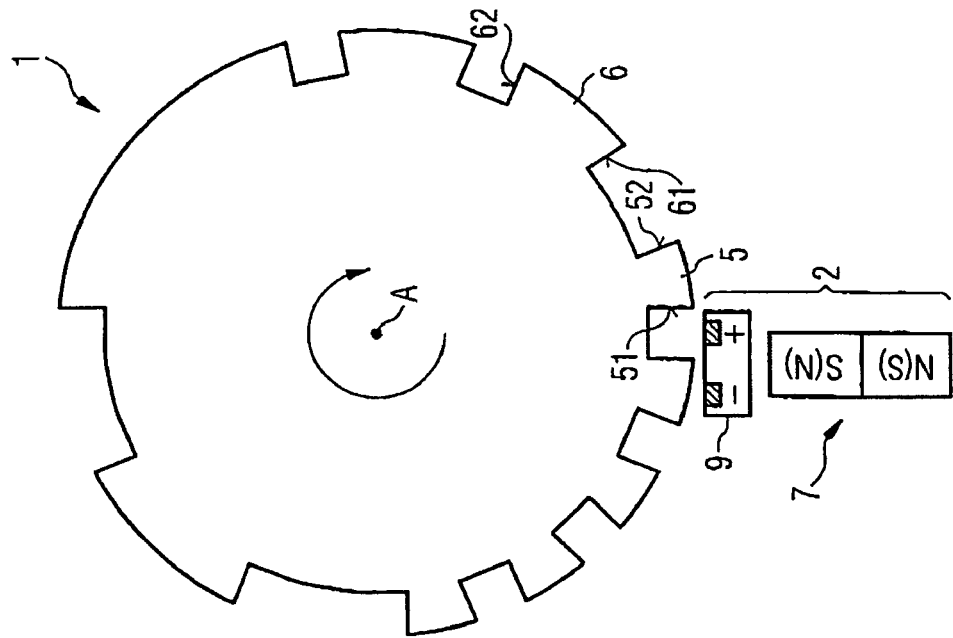
FIG. 1b illustrates a cross section of a rotating object in accordance with the prior art, the coding pattern of which is formed from a sequence of teeth and intervening gaps.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the FIG.(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention provides an improved method and also an improved rotary encoder for determining the angular position of an object rotating about a rotation axis.

In one embodiment, the method according to the invention, the angular position of an object rotating about a rotation axis in a rotation direction and having a coding pattern is ascertained using a sensor that senses the coding pattern.

In this embodiment, a first method involves ascertaining the coarse angular position of the rotating object with respect to the sensor whilst taking account of the coding pattern at a first instant.

A second method involves ascertaining the exact angular position of the rotating object with respect to the sensor whilst taking account of the coarsely ascertained angular position and also whilst taking account of at least one section of the coding pattern which extends counter to the rotation direction proceeding from that location of the coding pattern which is assigned to the coarse angular position.

A third method involves providing an output signal containing items of information about the exact angular position of the rotating object with respect to the sensor.

The method according to the invention thus utilizes the information about the coarse angular position of the rotating object with respect to the sensor at a specific instant in order to ascertain in forecasting fashion the coding pattern that is anticipated soon to be sensed by the sensor.

As a result, it becomes possible to take account of the influences of the expected coding pattern and the intersymbol interference caused thereby and, proceeding from the coarse angular position, to ascertain the exact angular position of the rotating object with respect to the sensor.

A particularly high accuracy in ascertaining the exact angular position of the rotating object can be achieved by taking account of not only the influences of that section of the coding pattern which is anticipated soon to be ascertained by the sensor, but also the influences of that section of the coding pattern that was ascertained by the sensor directly beforehand. However, in order to ascertain in forecasting fashion the coding pattern that is anticipated soon to be ascertained by the sensor, coding pattern must be known at least partly and be synchronized with the rotating object with respect to the angular position thereof with respect to the sensor.

For this purpose, in accordance with one embodiment of the invention, the coding pattern may be known as a whole, for example be stored in a storage unit. An example of a suitable coding pattern is the magnetic field generated by means of a number of magnets arranged around the periphery of the rotating object, as can be seen e.g. from FIG. 1*a*. A further embodiment for producing a coding pattern consists in providing the rotating object with teeth and intervening gaps in a manner similar to a gearwheel.

In accordance with one embodiment of the invention, the sensor that senses the coding pattern is a Hall element or a coil. If the Hall element or the coil is used according to FIG. 1*b* for sensing the angular position of an object provided with teeth and intervening gaps, then a magnetic field is preferably generated in the region of the sensor, the profile of which magnetic field changes on account of the rotation of the rotating object in a manner dependent on the coding pattern.

FIG. 4 illustrates the block diagram of a rotary encoder that operates according to the method according to the invention. A rotating object 1, for example made of metal, has a coding pattern that rotates together with this object 1. The coding pattern is formed in a manner similar to a gearwheel from teeth 5, 6 and gaps lying between the teeth.

A sensor 2 senses the coding pattern—as already described with reference to FIG. 1*b*—and generates a sensor signal S1 correlated with the coding pattern. The sensor signal S1 may be sampled for example with a clock timing with clock periods . . . k−1, k, k+1 . . . that is prescribed by a clock generator 17. In order to identify more closely a signal assigned to a specific clock period, this signal is hereinafter followed by the relevant clock period in brackets. By way of example, SA(k) denotes the output signal SA assigned to the clock period k.

The sensor signal S1 is fed to an adder 10, the output signal S2 of which is in turn fed to a first threshold value decoder 13.

Depending on the signal S2 fed to the threshold value decoder 13 and also depending on the threshold defined in the threshold value decoder 13, the latter generates an output signal S3, which, to a coarse approximation, is correlated with the current angular position of the rotating object 1 with respect to the sensor 2. The output signal S3 of the threshold value decoder 13 simultaneously represents the output signal SA of the circuit.

Instead of the threshold value decoder 13, which corresponds to a 1-bit analog-to-digital converter, an analog-to-digital converter having a resolution of more than 1 bit may also be used in a corresponding manner.

Furthermore, the output signal SA is fed to a signal predictor 14, in which the coding pattern of the rotating object 1 is stored. The signal predictor 14 compares and synchronizes said stored coding pattern with the pattern of the output signal SA which is correlated with the coding pattern of the rotating object 1. Furthermore, given a suitably chosen coding pattern, the signal predictor 14 can also identify the direction of rotation of the rotating object 1.

The signal predictor 14 thus knows the coarse current angular position and also the direction of rotation of the rotating object 1 with respect to the sensor 2 and can deduce therefrom the part of the coding pattern which the sensor is anticipated, i.e. with continued rotation and an unchanged direction of rotation, soon to sense. The signal predictor 14 generates a signal S4 on the basis of this, which signal S4 is fed to a first filter 11.

The output signal SA is correspondingly fed to a second filter 12. The first and second filters 11, 12 are preferably designed as FIR filters. They may have both identical and different filter properties, for example filter coefficients.

The first filter 11 generates an output signal S5, which, in the same way as an output signal S6 of the second filter 12, is fed to the adder 10 and added to the sensor signal S1. The output signal S2 of the adder 10 is thus formed from the sum of the output signal S1 of the sensor 2 and also the output signals S5 and S6 of the filters 11 and 12, respectively.

Depending on the configuration of the filters 11, 12, their output signals S5 and S6, respectively, may also be output in inverted fashion. In this case, instead of the adder 10 it is necessary to provide a subtractor whose two inputs connected to the outputs of the first and second filters 11, 12 are designed as inverting inputs.

Given suitable adaptation of the first and second filters 11 and 12, respectively, the signals S5, S6 generated by these filters 11, 12 can correct the sensor signal S1 in such a way that intersymbol interference contained in the sensor signal S1 is eliminated.

In general, the signal waveform, in particular the width and the height of a section of the sensor signal S1 that corresponds to a specific tooth flank 51 and 52, changes with the rotational speed of the rotating object 1. Therefore, in accordance with one preferred embodiment of the invention, the filter properties of the first and/or second filter 11 and/or 12, respectively, in the case of digital filters e.g. the filter coefficients thereof, are set in a manner dependent on the rotational speed of the rotating object 1 in order, in addition to the intersymbol interference, also to correct the signal waveform of the sensor signal S1.

In this embodiment, the filter properties of the filters 11, 12 are generally determined by filter coefficients. In this case, said filter coefficients may be fixedly prescribed. However, it is equally possible for all or some of the filter coefficients to be chosen dynamically, e.g. depending on the rotational speed and/or the direction of rotation of the rotating object.

In accordance with one embodiment of the invention, the filters 11, 12 are driven by the clock generator 17, in which case, during each clock period, the signal S4 and S3 present at the input of the relevant filter 11 and 12, respectively, is filtered by the relevant filter 11 and 12, respectively, and made available at the respective output S5 and S6, respectively, of the filters 11 and 12, respectively.

If three successive clock periods k−1, k and k+1 are considered, then each of these clock periods is assigned a corresponding angular position P(k−1), P(k) and P(k+1) assumed by the rotating object 1 at temporarily successively instants t(k−1), t(k) and t(k+1) with respect to the sensor 2.

If the rotating object passes an angular position P(k) at the instant t(k), then the sensor 2 generates a sensor signal S1(k). This sensor signal S1(k) is fed to an adder 10. Furthermore, signals S5(k+1) and S6(k−1) are also fed to the adder 10 and added to the sensor signal S1(k).

In this embodiment, the signal S6(k−1) contains an item of information about the sensor signal S1(k−1) which the sensor 2 output at the instant t(k−1) that is to say at the instant at which the rotating object 2 passed the angular position P(k−1). The signal S6(k−1) comprises the output signal SA(k−1)—filtered by means of the second filter 12—at the instant t(k−1).

The signal S5(k+1) correspondingly contains an item of information about the sensor signal S1(k+1) which the sensor 2 is anticipated to output—assuming that the direction of rotation of the rotating object remains the same—based on the "prediction" of the signal predictor 14 at the instant t(k+1) upon the angular position P(t+1) being passed. As a basis for the "prediction", the signal predictor 14 uses the output signal SA at instants or clock periods which precede the instant t(k+1).

The output signal S4 of the signal predictor 14 is filtered by means of the first filter 11 and provided as signal S5(k+1) at an output of the filter 11.

In the same way as in the case of the second filter 12, in the case of the first filter 11, too, the filter properties thereof, e.g., individual or all filter coefficients of a digital filter, may be fixedly prescribed or else be adapted dynamically e.g., in a manner dependent on the rotational speed and/or direction of rotation of the rotating object 1.

In order that the clock generator is able to properly predict the sensor signal 2 anticipated to be output by the sensor 2 during the next clock period, the output signal SA of the circuit is fed to the input of the signal predictor 14, where it is synchronized with the coding pattern stored in the signal predictor 14, so that the signal predictor 14 can coarsely ascertain the current angular position P(k) of the rotating object 1 with respect to the sensor 2.

With knowledge of this current angular position P(k), the signal predictor 14 can provide a predicted signal S4(k+1) at its output, which signal is fed to the first filter 11 as described above.

In the embodiment of specific coding patterns, the first and second filters 11, 12 have the same filter characteristic in all states for reasons of symmetry. In such cases, instead of the two filters 11, 12, it is also possible to provide just a single filter to which the signal S4(k+1) and the output signal SA (k−1) are alternately fed at double the clock frequency.

Furthermore, a storage device clocked at double the clock frequency and also a changeover device clocked at double the clock frequency are to be provided in this case in order alternatively to feed one of the filtered signals S4(k+1), S6(k−1) directly and the other, which is stored in the storage device, to the second and third input, respectively, of the adder 10.

Figure 3:
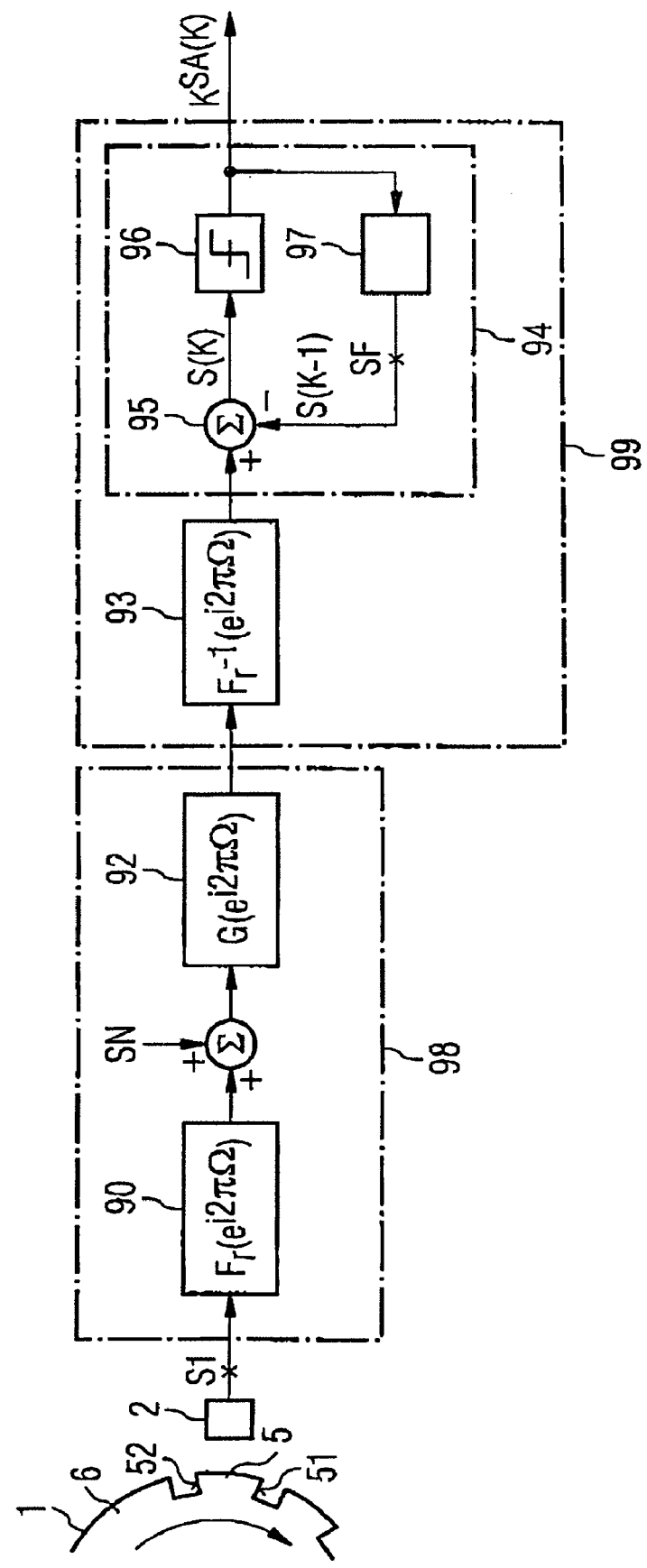
FIG. 3 illustrates a block diagram of a rotary encoder that operates according to a method in accordance with the prior art.

In the case of the output signal SA generated by means of the method according to the invention, in contrast to the method illustrated in FIG. 3, no latency phase occurs since it does not require a feed forward equalizer (integrated into the signal path) such as e.g. the FFE 93 in accordance with FIG. 3.

Furthermore, the sensor signal S1, instead of being fed to the adder 10 or a subtractor, may firstly be conditioned by means of a signal conditioning unit, e.g., a signal conditioning unit 98 in accordance with FIG. 3, and only then be fed to the adder 10 or the subtractor.

Figure 5A:
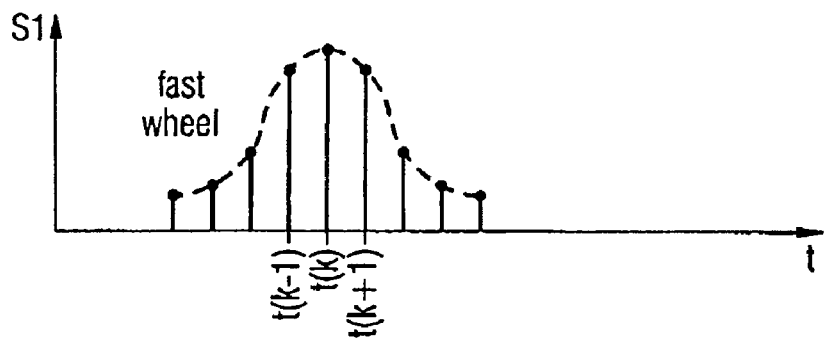
FIG. 5a illustrates the clocked sampling of the sensor signal of a rotary encoder according to the invention in accordance with FIG. 4 in the case of a rotating object that rotates rapidly, with a specific sampling rate.

FIG. 5a illustrates the temporal profile of a typical sensor signal S1. In this case, the times corresponding to the clock signals of the clock generator 17 are marked by vertical lines. By way of example, the times corresponding to the clock cycles k−1, k, k+1 are identified by t(k−1), t(k) and t(k+1). The illustrated section of the sensor signal S1 corresponds to a specific angular range swept over by the rotating object 1 in accordance with FIG. 4 during its rotation with respect to the sensor 2.

Figure 5B:
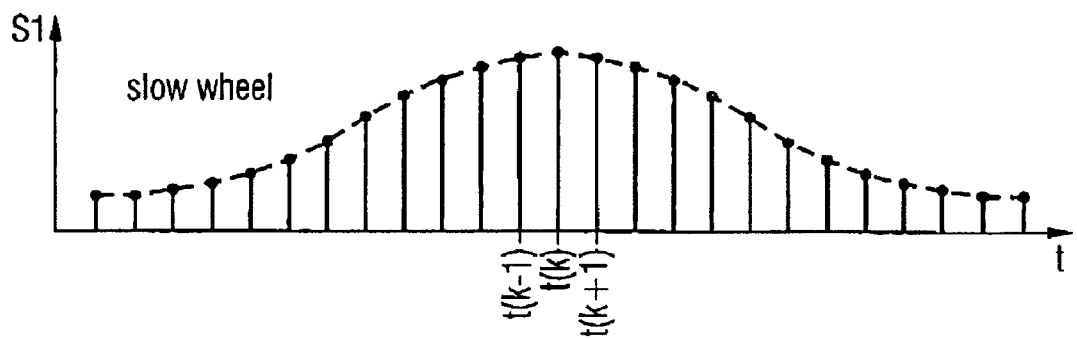

If consideration is given, as illustrated in FIG. 5b, to the sensor signal S1 during a rotation of the rotating object 1 through the same angular range corresponding to that section of the sensor signal S1 which is illustrated in FIG. 5a, in the case of a lower rotational speed of the rotating object, then the angular range of the rotating object corresponding to the section of the sensor signal S1 considered is sampled more frequently than is the case for FIG. 5a, since the period duration of the clock signal, which results from the temporal difference between two successive clock signals is constant.

In order to avoid different resolutions of the same angular range which result from this at different rotational speeds, the clock frequency of the clock generator 17 as is known from FIG. 4 and thus the period duration of the clock signal, in accordance with one embodiment of the invention, is adapted to the rotational speed of the rotating object in such a way that the number of sampling points for a specific angle of rotation range of the rotating object is independent of the rotational speed thereof.

Figure 5C:
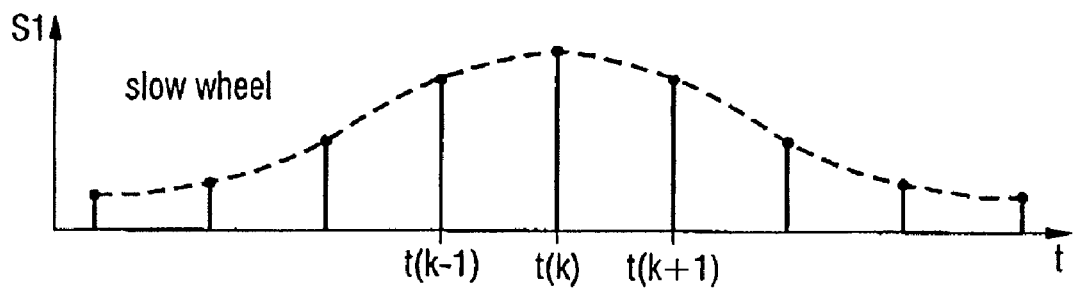
FIG. 5c illustrates the clocked sampling of the sensor signal in accordance with FIG. 5b, but with a sampling rate adapted to the slow rotational speed of the rotating object.

FIG. 5c illustrates a section of the sensor signal S1 which corresponds to the same angle of rotation range of the rotating object as the sections of the sensor signals S1 in accordance with FIGS. 5a and 5b and in the case of which the number of clock cycles with respect to the considered angular range of the rotating object is independent of the rotational speed and thus identical to the number of clock cycles with respect to the same angular range, as is illustrated in FIG. 5. The period duration of the clock signal is thus variable.

In order to achieve synchronization between the rotating object and the clock signal in the case of this preferred embodiment of the invention, the clock generator used may be, by way of example, a phase-regulated decoding unit (PLL=phase locked loop), to which the output signal SA described in FIG. 4 is fed and which generates the clock signal therefrom. For the case where the clock generator 17 in accordance with FIG. 4 is designed as a phase-regulated decoding unit, the feeding of the output signal SA to the clock generator 17 that is necessary in this case is illustrated in dashed fashion.

Figure 6:
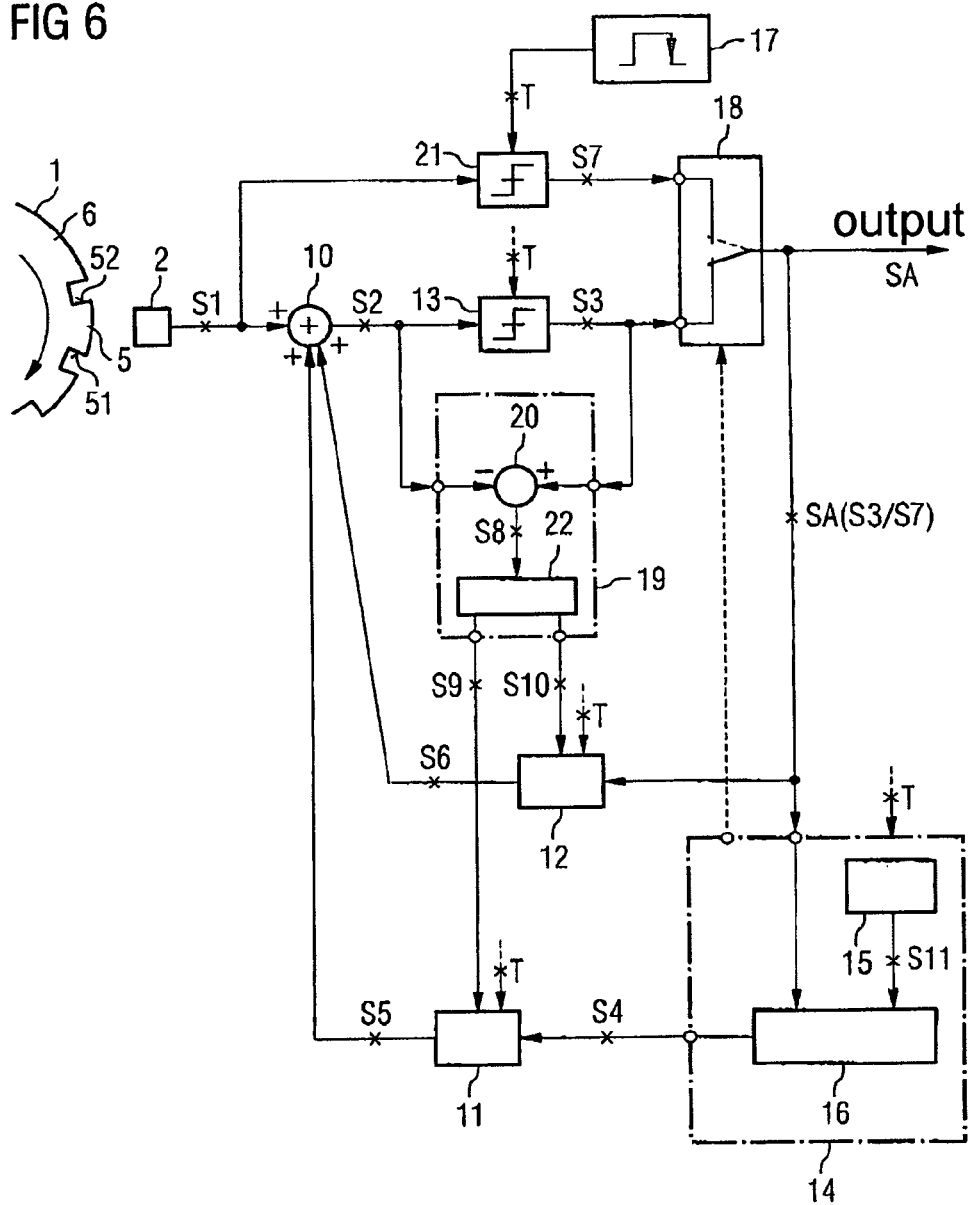
FIG. 6 illustrates a block diagram of a rotary encoder that operates according to a preferred embodiment of the method according to the invention.

FIG. 6 illustrates the block diagram of a rotary encoder in which the angular position of a rotating object 1 with respect to a sensor 2 is ascertained in accordance with one preferred embodiment of the method according to the invention. The block diagram in accordance with FIG. 6 essentially corresponds to the block diagram in accordance with FIG. 4, but contains various optional extensions.

A first optional extension consists in dynamically adapting the filter 11 and/or 12 to the angular position and rotational speed of the rotating object 1. Such signal adaptation is expedient particularly when the intersymbol interference is not symmetrical or when the sensor signal S1 of the sensor 2 has distortions dependent on the rotational speed.

By way of example, in the case of specific sensors 2, with an increasing rotational speed of the rotating object 1 with respect to the sensor 2, the signal width of the sensor signal S1 generated by a specific location of the rotating object 1 decreases in conjunction with a simultaneous increase in the associated maximum signal level.

The signal adaptation may be effected e.g. by means of a filter driving unit 19. Such a filter driving unit 19 may comprise a subtractor 20, for example, which forms a difference signal S8=S3–S2 from the difference between the signals S3 and S2, which difference signal is fed to an adaptation unit 22.

Depending on the signal S8 the adaptation unit 22 generates output signals S9 and/or S10 of the filter driving unit 19, which are fed to the filters 11 and 12, respectively, and influence the filter properties thereof, e.g. the filter coefficients thereof, in a suitable manner.

Through the comparison of the signals S2 and S3, the filter driving unit 19 can compensate not only for an alteration of the sensor signal S1 that is dependent on the rotational speed of the rotating object 1 but also, by way of example, such an alteration that is dependent on the temperature of the rotating object 1 or temperature of the sensor 2.

A further optional extension relates to the signal predictor 14. In order to operate properly the signal predictor 14 must know the coding pattern of the rotating object 1.

For the embodiment where the coding pattern of the rotating object 1 is known, this pattern can be stored initially, that is to say before the beginning of a determination of the angular position, in a storage unit 15 of the signal predictor 14.

It is equally possible, however, that during operation of the arrangement, in the initial phase, during one or more revolutions of the rotating object 1, the coding pattern thereof is ascertained by means of a learning unit (not specifically illustrated), to which in particular the output signal SA is fed, and is stored in the storage unit 15.

Thus, a corresponding unit for ascertaining the angular position of a rotating object with respect to a sensor is self-learning and not fixedly defined with regard to a specific rotating object or a specific coding pattern. In this way, an adaptive system arises which can be used for different or varying coding patterns.

In order that the signal predictor 14 can decide what angular position of the rotating object 1 with respect to the sensor 2 is anticipated to be the next one, it must first know the current angular position of the rotating object 1 with respect to the sensor 2. A prerequisite for this is that the coding pattern stored in the storage unit 15 is synchronized with the coding pattern of the rotating object 1 and also with the angular position thereof with respect to the sensor 2.

For this purpose, the signal predictor 14 comprises a synchronization unit 16, to which the output signal SA is fed. The output signal SA contains items of information about the coding pattern of the rotating object 1 and also about the angular position of the rotating object 1 with respect to the sensor 2. Furthermore, the storage unit 15 generates a signal S11 based on the coding pattern stored in it.

Consequently, the synchronization unit 16 can compare the output signal SA and an output signal S11 of the storage unit 15 with one another and shift said output signal S11, if appropriate, relative to the output signal SA until both are synchronized with one another.

As soon as synchronism is present, the signal predictor 14 knows the—coarse—angular position of the rotating object 1 with respect to the sensor 2 and —given a suitably chosen coding pattern—also the direction of rotation thereof and, consequently, the anticipated angular position of the rotating object 1 with respect to the sensor 2 at a subsequent instant, so that the signal predictor 14 can generate a "predicted" signal corresponding to the angular position at the subsequent instant.

In an operating state in which the above-described synchronization is not present, for example, in the start-up phase, it may happen that the output signal SA of the circuit, which is generally identical to the output signal S3 of the first threshold value decoder 13, does not reproduce the angular position of the rotating object 1 with respect to the sensor 2 accurately enough because the first and second filters 11, 12 are not provided with the items of information required for their proper functioning, for example for ascertaining the filter coefficients of the filters 11, 12.

On account of the feedback of the output signals S5 and S6, which are generated by the first and second filters 11 and 12, respectively, and are not yet correct in this operating phase, to the input of the first threshold value decoder 13, it can happen, with synchronization not yet been present, that the output signal SA reproduces the angular position of the rotating object 1 with respect to the sensor 2 worse than without said feedback.

In order to avoid an insufficient output signal SA in the absence of synchronization between the coding pattern stored in the storage unit 15 and the output signal SA of the circuit, a further optional extension is provided according to the invention. The extension comprises a second threshold value decoder 21 and also an operating mode changeover switch 18. The second threshold value decoder 21 is preferably identical functionally to the first threshold value decoder 13.

The second threshold value decoder 21 is fed the sensor signal S1 without the signals S5 and S6 generated by the first and second filters 11 and 12, respectively, being superposed on said sensor signal S1. Consequently, the second threshold value decoder 21 generates an output signal S7 that reproduces the angular position of the rotating object 1 with respect to the sensor 2 in the case where synchronization is not yet present generally more accurately than the output signal S3 of the first threshold value decoder 13.

In order that, in this operating state of absent synchronization, the signal S7 is made available instead of the signal S3 as output signal SA of the circuit, the operating mode changeover switch 18 is provided, which makes available at the output the output signal S7 of the second threshold value decoder 21 instead of the output signal S3 of the first threshold value decoder 13.

It is only if the synchronization unit 16 has ascertained sufficient synchronization between the coding pattern of the rotating object 1 that is sensed by the sensor 2 and the coding pattern that is stored in the storage unit 15 that it drives the operation mode changeover switch 18 in such a way that instead of the output signal S7 of the second threshold value decoder 21, the output signal S3 of the first threshold value decoder 13 is used as output signal SA of the circuit.

The start-up phase is thus configured in such a way that, in a synchronization phase, the angular position of the rotating object 1 with respect to the sensor 2 is synchronized with the coding pattern stored in the storage unit 15.

For the case where the coding pattern has not yet been stored in the storage unit 15, the synchronization phase is additionally preceded by a learning phase in which the coding pattern of the rotating object 1 is "learned" and stored in the storage unit 15.

Once the synchronization phase is concluded, there follows a continuous operating phase in which all or at least some of the filter coefficients of the first and second filters 11, 12 are adapted dynamically.

In order to shorten the duration of the synchronization phase, provision is made, in accordance with one preferred embodiment of the method according to the invention, for providing all or some of the filter coefficients with suitable initial values.

If the use of such a filter driving unit 19 is dispensed with, then the corresponding filter coefficients may also be fixedly programmed in. In general, it is also possible to change over between an operating mode with fixed filter coefficients and an operating mode with variable filter coefficients. The filter coefficients of filter stages of the first and/or the second filter 11 and/or 12, respectively, are particularly preferably arranged on a Lorentz curve.

In many applications, the same filter coefficients are used for the first and second filters 11 and 12, respectively, so that only one set of filter coefficients is required in these cases. If the first filter 11 and the second filter 12 are designed as filters of the same order n and if $\alpha 0, \alpha 1, \ldots, \alpha n$ are the filter coefficients of the 0-th, the 1st, ..., the n-th filter stage of the first filter 11, then the filter coefficients of the 0-th, the 1st, ..., the n-th filter stage of the second filter 12, in accordance with one preferred embodiment of the invention, are equal to $\alpha n, \ldots, \alpha 1, \alpha 0$, that is to say are virtually "mirrored".

Figure 7:
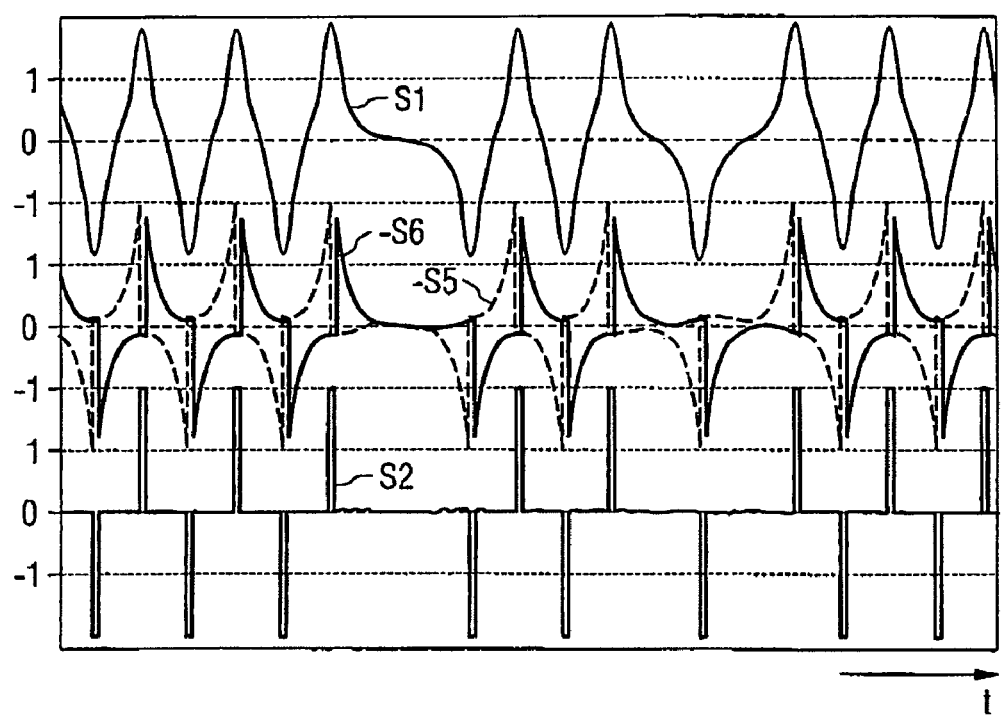
FIG. 7 illustrates the profile of a plurality of significant signals in the case of a circuit in accordance with FIGS. 4 and 6.

FIG. 7 illustrates one example of a possible temporal profile of the signals S1, S2, S5 and S6. These signals represent the signals correspondingly designated in FIGS. 4 and 6 given proper synchronization between the coding pattern of the rotating object 1 and coding pattern stored in the signal predictor 14. In this case, the signals S5 and S6 are illustrated in inverted fashion, that is to say in a manner provided with a negative sign.

The signal S1 has maxima and minima whose form essentially corresponds to Lorentz curves such as are generated by the sensor 2 in accordance with FIGS. 4 and 6 in the region of a tooth flank of the rotating object 1 that passes the sensor. However, a deviation from the ideal Lorentz form occurs in this case due to intersymbol interference. Moreover, the curve form changes depending on the rotational speed of the rotating object.

Given a suitable design of the filters 11 and 12 in accordance with FIGS. 4 and 6, the feedback of the signals S5 and S6 makes it possible to have the effect that the output signal SA of the circuit reproduces the angular position of the rotating object 1 essentially with an accurate phase, that is to say that not only is it possible to ascertain what tooth 5, 6 is opposite the sensor 2 at a specific instant, but that it is furthermore also possible to make a statement about what location of a tooth 5, 6 or of a tooth gap is opposite the sensor 2.

In accordance with a one embodiment of the method according to the invention, the signals S5 and S6 may also be designed in such a way that, on account of their superposition with the sensor signal S1, there is eliminated from the sensor signal S1 not only the intersymbol interference described but also the different signal width—dependent on the rotational speed of the rotating object 1 —of the partial signals forming the sensor signal S1, so that the signal S2 illustrated in FIG. 7 is present as a result.

The signal S2 essentially exhibits needle-shaped pulses having a very small width, to the positions of which the angular positions of the toothed flanks 51, 52 of the rotating object 1 with respect to the sensor 2 in accordance with FIGS. 4 and 6 correspond very precisely and with a negligible phase shift.

The invention has been described above by way of example on the basis of a coding pattern formed from teeth and intervening gaps of the rotating object. In general, however, the method according to the invention can also be employed when sensing different types of coding patterns if intersymbol interference occurs during the sensing thereof. This holds true in particular for coding patterns that are generated in accordance with the arrangement described in FIG. 1a.

Figure 1A:
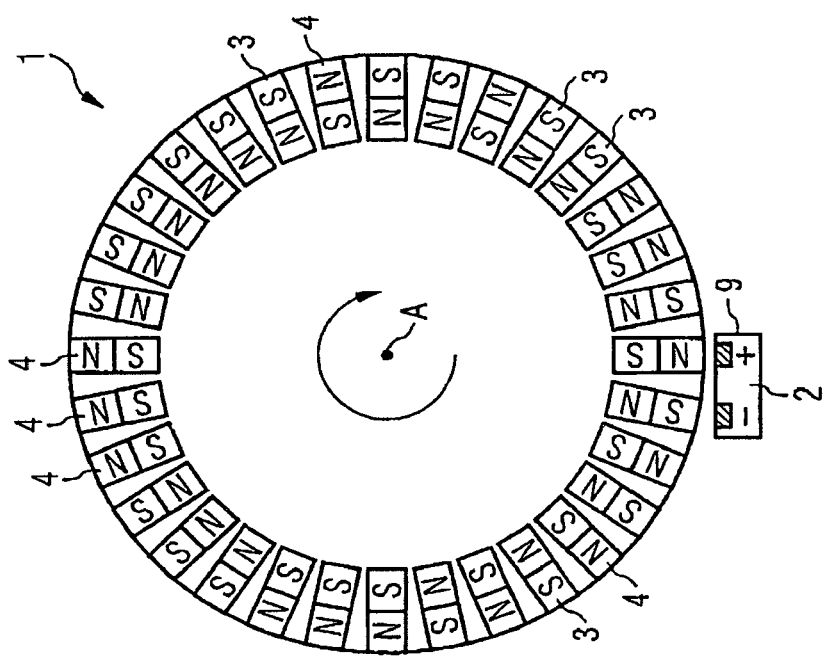
FIG. 1a illustrates a cross section of a rotating object in accordance with the prior art with a magnetic coding pattern.
Figure 2:
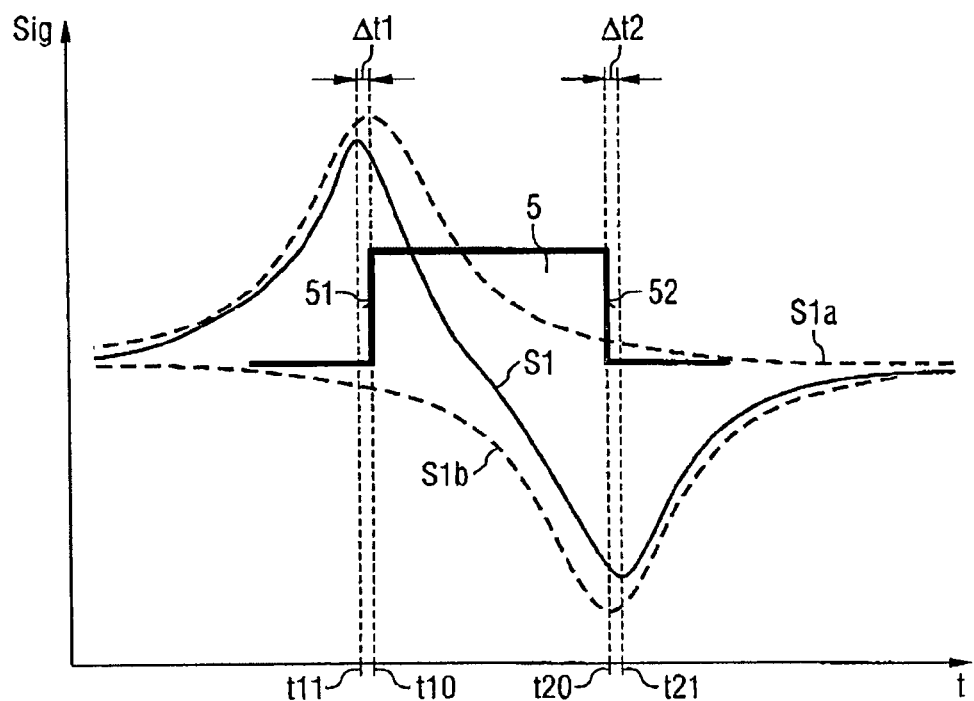
FIG. 2 illustrates the profile of a signal generated by a sensor that senses the rotating object in accordance with FIG. 1b, in accordance with the prior art.

The sensors used for sensing are preferably designed in accordance with the sensors 2 described in FIGS. 1a and 1b, but are not restricted to the embodiments shown there. Rather, the method according to the invention can be applied to all arrangements having intersymbol interference provided that the underlying coding pattern can be ascertained at least partly before it is detected by the sensor that senses the coding pattern, so that a prediction is possible.

For a person skilled in the art, the method described can also be transferred in a simple manner to non-rotating objects, for example a toothed rack of a linear position encoder.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for determining the angular position of an object rotating about a rotation axis in a rotation direction and having a coding pattern, using a sensor that senses the coding pattern, comprising:

ascertaining the coarse angular position of the rotating object with respect to the sensor while taking account of the coding pattern at a first instant;

ascertaining the exact angular position of the rotating object with respect to the sensor while taking account of the coarsely ascertained angular position and also while taking account of at least one section of the coding pattern which extends counter to the rotation direction proceeding from that location of the coding pattern which is assigned to the coarse angular position; and providing an output signal containing items of information about the exact angular position of the rotating object with respect to the sensor.

2. The method as claimed in claim 1, comprising additionally ascertaining the exact angular position while taking account of at least one section of the coding pattern sensed by the sensor directly prior to the first instant.

3. The method as claimed in claim 1, comprising wherein the sensor is formed as a magnetic field sensor.

4. The method as claimed in claim 3, comprising wherein the magnetic field sensor comprises a Hall element or a coil.

5. The method as claimed in claim 1, comprising wherein the sensor has a differential output.

6. The method as claimed in claim 1, comprising wherein the rotating object is a camshaft or a crankshaft.

7. The method as claimed in claim 1, comprising wherein the coding pattern is formed by at least one magnet connected to the rotating object.

8. The method as claimed in claim 1, comprising wherein the coding pattern is formed in gearwheel-like fashion on the rotating object.

9. A method for determining the angular position of an object rotating about a rotation axis in a rotation direction and having a coding pattern, using a sensor that senses the coding pattern, comprising:
  ascertaining the coarse angular position of the rotating object with respect to the sensor while taking account of the coding pattern at a first instant;
  ascertaining the exact angular position of the rotating object with respect to the sensor while taking account of the coarsely ascertained angular position and also while taking account of at least one section of the coding pattern which extends counter to the rotation direction proceeding from that location of the coding pattern which is assigned to the coarse angular position; and
  providing an output signal containing items of information about the exact angular position of the rotating object with respect to the sensor, including feeding a first signal generated by the sensor to a first input of an adder or subtractor, which provides a second signal at an output.

10. The method as claimed in claim 9, comprising generating a third signal from the second signal using a first threshold value decoder or using a first analog-to-digital converter.

11. The method as claimed in claim 10, comprising generating a fourth signal from the output signal using of a signal predictor while taking account of the coding pattern, the fourth signal containing an item of information about at least one section of the coding pattern which extends counter to the rotation direction proceeding from that location of the coding pattern which is assigned to the coarse angular position.

12. The method as claimed in claim 11, comprising wherein the signal predictor comprises a storage unit, in which the coding pattern is stored.

13. The method as claimed in claim 12, comprising wherein the signal predictor comprises a synchronization unit, which synchronizes the output signal with the coding pattern stored in the storage unit.

14. The method as claimed in claim 11, comprising generating a fifth signal from the fourth signal using a first filter and feeding the fifth signal to a second input of the first adder or the subtractor.

15. The method as claimed in claim 14, comprising generating a sixth signal from the output signal using of a second filter and feeding the fifth signal to a third input of the first adder or the subtractor.

16. The method as claimed in one of claim 15, comprising generating a seventh signal from the first signal using a second threshold value decoder or using a second analog-to-digital converter.

17. The method as claimed in claim 16, comprising choosing between the third signal and the seventh signal as output signal via an operating mode changeover switch.

18. The method as claimed in claim 10, comprising using the third signal as an output signal.

19. The method as claimed in claims 10, comprising wherein the second signal and the third signal are fed to a filter driving unit, which, in a manner dependent on the signal waveform of the first signal, the signal waveform changing with the rotational speed of the rotating object, generates an eighth signal and/or a ninth signal, which is used for determining the filter properties in the filtering of the output signal.

20. The method as claimed in of claim 10, comprising wherein a clock generator generates a clock signal, in the rhythm of which the second signal is sampled by the first threshold value decoder or the first analog-to-digital converter.

21. The method as claimed in claim 20, comprising wherein the clock signal has a constant period duration.

22. The method as claimed in claim 20, comprising wherein the clock signal has a variable period duration dependent on the rotational speed of the rotating object.

23. The method as claimed in claim 22, comprising wherein the clock generator is designed as a phase-regulated decoding unit, to which the output signal is fed.

24. A rotary encoder for determining the angular position of an object rotating about a rotation axis in a rotation direction and having a coding pattern, using a sensor that senses the coding pattern, comprising:
  means for ascertaining the coarse angular position of the rotating object with respect to the sensor whilst taking account of the coding pattern at a first instant;
  means for ascertaining the exact angular position of the rotating object with respect to the sensor whilst taking account of the coarsely ascertained angular position and also whilst taking account of at least one section of the coding pattern which extends counter to the rotation direction proceeding from that location of the coding pattern which is assigned to the coarse angular position; and
  output for providing an output signal containing items of information about the exact angular position of the rotating object with respect to the sensor.

25. The rotary encoder as claimed in claim 24, comprising means for ascertaining the exact angular position whilst taking account of at least one section of the coding pattern sensed by the sensor directly prior to the first instant.

26. The rotary encoder as claimed in claim 24, comprising an adder or subtractor, which has a first input for feeding in a first signal generated by the sensor, and also an output for providing a second signal.

27. The rotary encoder as claimed in claim 26, comprising wherein the output of the adder or the subtractor is connected to the input of a first threshold value decoder or to the input of a first analog-to-digital converter, and the adder or subtractor having an output for outputting a third signal.

28. The rotary encoder as claimed in claim 27, comprising wherein the output of the threshold value decoder or the analog-to-digital converter is connected to the input of a signal predictor, the signal predictor having an output for providing a fourth signal while taking account of the coding pattern, and the fourth signal containing an item of information about at least one section of the coding pattern which extends counter to the rotation direction proceeding from that location of the coding pattern which is assigned to the coarse angular position.

29. The rotary encoder as claimed in claim 28, comprising wherein the signal predictor comprises a storage unit for storing the coding pattern.

30. The rotary encoder as claimed in claim 29, comprising wherein the signal predictor comprises a synchronization unit for synchronizing the output signal with the coding pattern stored in the storage unit.

31. The rotary encoder as claimed in claim 28, comprising wherein the output of the signal predictor is connected to the input of a first filter, the first filter having an output for providing a fifth signal, which is connected to a second input of the first adder or the subtractor.

32. The rotary encoder as claimed in claim 27, comprising wherein the output for providing the output signal is connected to the input of a second filter, the second filter having an output for providing a sixth signal, which is connected to a third input of the first adder or the subtractor.

33. The rotary encoder as claimed in claim 27, comprising wherein the first input of the adder or the subtractor is connected to the input of a second threshold value decoder or to the input of a second analog-to-digital converter, and the second threshold value decoder or the second analog-to-digital converter having an output for providing a seventh signal.

34. The rotary encoder as claimed in claims 27, comprising wherein the output for providing an output signal is connected to the output of the first threshold value decoder or to the output of the first analog-to-digital converter.

35. The rotary encoder as claimed in claim 32 comprising an operating mode changeover switch, by means of which the output for providing an output signal can be connected to the output of the first threshold value decoder or the output of the first analog-to-digital converter or to the output of the second threshold value decoder or the output of the second analog-to-digital converter.

36. The rotary encoder as claimed in claim 27, comprising wherein the input and the output of the first threshold value decoder or the first analog-to-digital converter are in each case connected to an input of a filter driving unit, the filter driving unit having a first output for providing an eighth signal dependent on the signal waveform of the first signal, said signal waveform changing with the rotational speed of the rotating object, and the filter driving unit having a second output for providing a ninth signal dependent on the signal waveform of the first signal, said signal waveform changing with the rotational speed of the rotating object.

37. The rotary encoder as claimed in claim 27 comprising a clock generator for generating a clock signal, which controls the sampling of the second signal by the first threshold value decoder or the first analog-to-digital converter.

38. The rotary encoder as claimed in claim 37, in which the clock signal has a constant period duration.

39. The rotary encoder as claimed in claim 37, comprising wherein the clock signal has a variable period duration dependent on the rotational speed of the rotating object.

40. The rotary encoder as claimed in claim 39, comprising wherein the clock generator is designed as a phase-regulated decoding unit, which has an input connected to the output for providing the output signal.

41. The rotary encoder as claimed in claim 24, comprising wherein the rotating object is a camshaft or a crankshaft.

42. The rotary encoder as claimed in claim 24, comprising wherein the coding pattern is formed by at least one magnet connected to the rotating object.

43. The rotary encoder as claimed in claim 24, comprising wherein the coding pattern is formed in gearwheel-like fashion on the rotating object.

44. The rotary encoder as claimed in claim 24, comprising wherein the sensor is formed as a magnetic field sensor.

45. The rotary encoder as claimed in claim 44, comprising wherein the magnetic field sensor comprises a Hall element or a coil.

46. The rotary encoder as claimed in claim 24, comprising wherein the sensor has a differential output.

* * * * *